United States Patent [19]
Juditzki

[11] 3,837,246
[45] Sept. 24, 1974

[54] METHOD OF AND MACHINE FOR SEVERING COMPOUND PLATES

[75] Inventor: Franz Juditzki, Kreuztal-Buschhutten, Germany

[73] Assignee: Hoesch Aktiengesellschaft, Dortmund, Germany

[22] Filed: June 19, 1972

[21] Appl. No.: 264,128

[30] Foreign Application Priority Data
June 18, 1971 Germany............................ 2130249

[52] U.S. Cl............................ 83/26, 83/26, 83/82, 83/110, 83/111, 83/318, 83/801
[51] Int. Cl........................ B29c 17/10, B23d 53/00
[58] Field of Search............ 83/26, 81, 82, 110, 111, 83/113, 318, 801, 820; 29/90.5, 90 R

[56] References Cited
UNITED STATES PATENTS

| | | | |
|---|---|---|---|
| 155,754 | 10/1874 | Roche................................ | 83/102.1 |
| 1,538,086 | 5/1925 | Buttress............................. | 83/110 |
| 2,621,693 | 12/1952 | Grills.................................. | 83/102.1 |
| 2,647,576 | 8/1953 | Marcalus........................... | 83/820 X |
| 2,684,530 | 7/1954 | Weinberg.......................... | 83/820 UX |
| 3,174,373 | 3/1965 | Gensman........................... | 83/110 |
| 3,332,819 | 7/1967 | Siempelkamp.................... | 83/110 UX |
| 3,474,693 | 10/1969 | Wilkie et al....................... | 83/801 |

*Primary Examiner*—J. M. Meister
*Attorney, Agent, or Firm*—Michael S. Striker

[57] ABSTRACT

Elongated compound plates are severed at desired intervals in a bandsawing machine wherein the frame for a travelling saw band is movable in and counter to the direction of movement of the plates as well as in and counter to a second direction at right angles to the first direction. The frame further supports a tool which is located behind the band, as considered in the second direction, and is provided with two deburring surfaces serving to penetrate into the kerf which is formed while the frame moves simultaneously in the first and second directions. The freshly severed portions of plates are accelerated in the first direction to increase the width of kerfs so that the band can be readily retracted counter to the second direction prior to returning to a starting position by moving with the frame counter to the first direction. The widening of the kerf can be effected by the tool or by a conveyor which receives successively separated portions of moving plates and accelerates them in the first direction. The plates are free to catch up with and to push the freshly separated portions in the first direction as soon as the band is retracted counter to the second direction.

7 Claims, 3 Drawing Figures

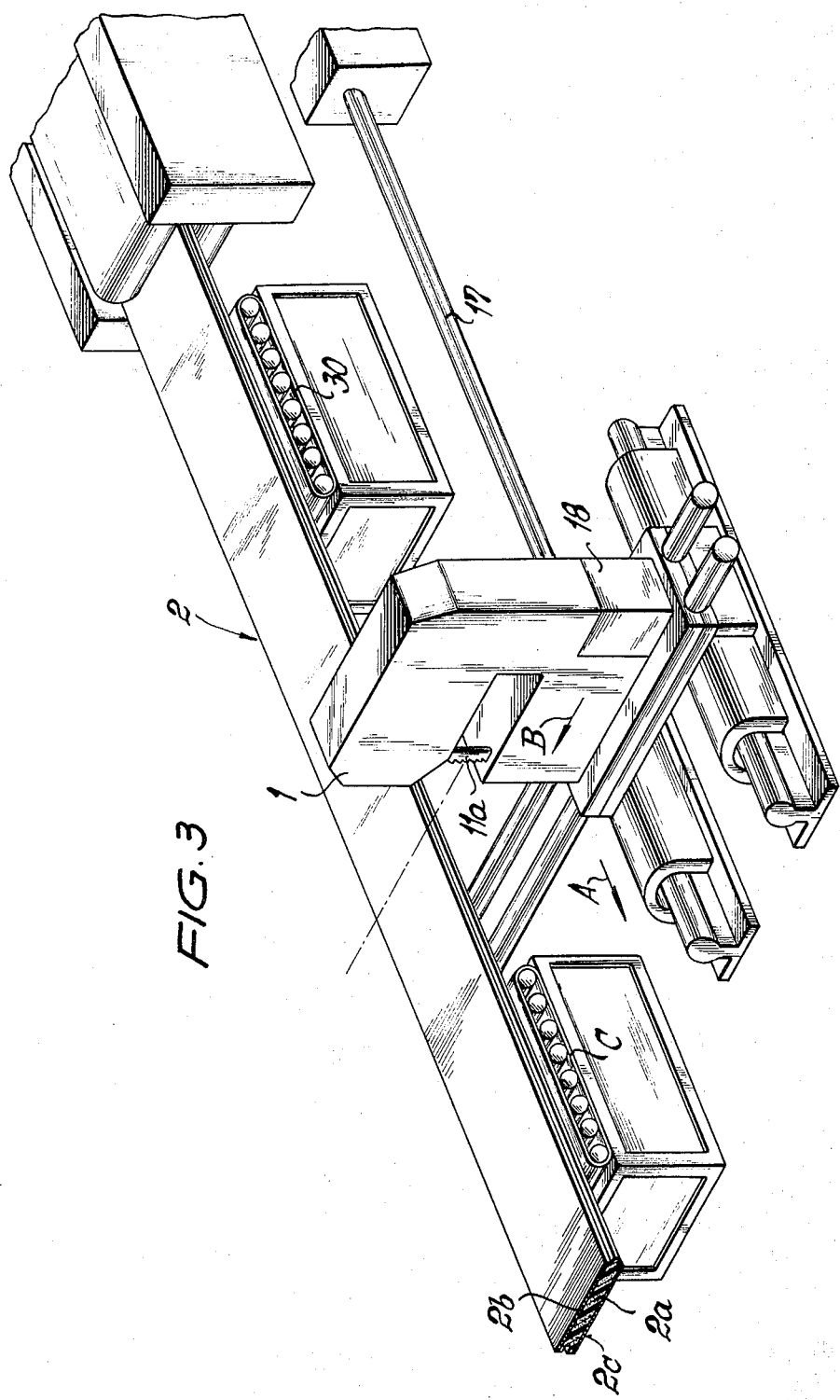

METHOD OF AND MACHINE FOR SEVERING COMPOUND PLATES

BACKGROUND OF THE INVENTION

The present invention relates to a method and machine for severing plate-like workpieces, particularly for severing elongated plates having a central or core layer which is sandwiched between outer layers of metal or other hard material. More particularly, the invention relates to improvements in bandsawing machines and to a method of severing elongated plates in such machines while the plates move lengthwise.

It is already known to sever elongated plates wherein a central layer of foamed plastic material is sandwiched between outer layers consisting of steel sheet stock or the like by resorting to a machine which employs a circular saw blade. The blade moves with the advancing plate and is simultaneously caused to move across the path of the plate to form therein a kerf with attendant separation of a portion at the leading end of the plate. Upon completion of a transverse cut, the blade is swung out of the path of the plate and is returned to a starting position so as to be ready to form a fresh cut. A drawback of such machines is that the penetration of the blade into the material of the moving plate necessitates the application of substantial forces with attendant formation of pronounced burrs at both sides of the kerf. Furthermore, the cutting operation results in the generation of substantial quantities of sawdust. The burring of surfaces which flank the kerf often results in corrosion unless the surfaces are subjected to a special treatment.

It is further known to sever elongated plates of the above outlined type in a bandsawing machine by moving a saw band relative to a stationary plate. The kerf which is formed by a saw band is much more satisfactory than that formed by a circular saw blade. Since the separated portions of the plate remain at a standstill or are removed upon the making of a cut, the saw band can be readily returned to its starting position. As a result, that portion of the saw band which penetrates into the material of the plate is twisted through 90° relative to the remaining length of the band. Such bandsawing machines are incapable of severing a moving plate because the advancing plate would interfere with return movement of the saw band to its starting position.

SUMMARY OF THE INVENTION

An object of the invention is to provide a novel and improved method of cutting elongated plate-like workpieces in a bandsawing machine while the workpieces are in continuous motion not only during but also prior to and after the formation of successive kerfs.

Another object of the invention is to provide a method according to which a moving plate-like workpiece can be severed at frequent intervals, with a high degree of reproducibility, and with minimal generation of burrs.

A further object of the invention is to provide a method of severing elongated plate-like workpieces in bandsawing machines according to which the burrs can be removed in the course of the severing step so that the severed portions of the workpieces need not be subjected to additional deburring treatment.

An additional object of the invention is to provide a novel and improved bandsawing machine for plate-like workpieces which are in continuous motion prior, during and subsequent to the making of successive kerfs.

Still another object of the invention is to provide the bandsawing machine with novel and improved deburring means and with novel and improved means for moving the saw band and the workpiece with and relative to each other.

Another object of the invention is to provide a bandsawing machine whose output is much higher than the output of presently known machines for the sawing of elongated plates, particularly plates wherein one or more central or core layers of synthetic plastic foam are sandwiched between outer layers of metal or other hard material.

The method of the present invention is resorted to for the severing of an elongated plate by means of a saw band in a bandsawing machine, particularly a compound plate having a central or core layer of synthetic plastic material which is sandwiched between outer layers of metal or other hard material. The method comprises the steps of moving the plate at a predetermined speed in a first direction, moving the saw band sideways from a starting position at one side of the moving plate in the first direction and simultaneously moving the band in a second direction from the one toward the other side of the plate whereby the band forms a kerf across and separates a portion from the leading end of the moving plate, accelerating the thus separated portion in the first direction to increase the width of the kerf, moving the band in the thus enlarged kerf counter to the second direction back to the one side of the moving plate while continuing to move the band in the first direction, moving the band counter to the first direction back to its starting position, and again moving the band in the first and second directions to thus separate a second portion from the moving plate.

The successively severed and accelerated portions are preferably decelerated so that the next-following portions of the moving plate can catch up with and push the decelerated portions in the first direction.

The accelerating step may comprise increasing the speed of movement of the band in the first direction beyond the predetermined speed after a portion is separated from the remainder of the moving plate and while the band or a member which moves therewith is still located in the respective kerf so that the freshly separated portion is propelled in the first direction and moves away from the next-following portion of the plate to provide ample room for movement of the band counter to the second direction. It is also possible to accelerate successively separated portions of the plate by positively entraining such portions in the first direction (e.g., by means of a suitable conveyor) at a speed which exceeds the predetermined speed.

The kerf forming step normally entails the formation of at least some burrs, not only along the trailing faces of the freshly separated portions but also along the front faces of the next-following portions. In accordance with a further feature of the invention, at least some of such burrs can be removed while the saw band moves in the second direction so that the deburring operation is completed simultaneously with separation of a portion from the moving plate.

The portions can be used for the assembly of building structures and more particularly for wall structures or the like.

The novel features which are considered as characteristic of the invention are set forth in particular in the appended claims. The improved bandsawing machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a perspective view of a bandsawing machine together with other machines.

DESCRIPTION OF THE PREFERRED EMBODIMENTS

Figure 1:
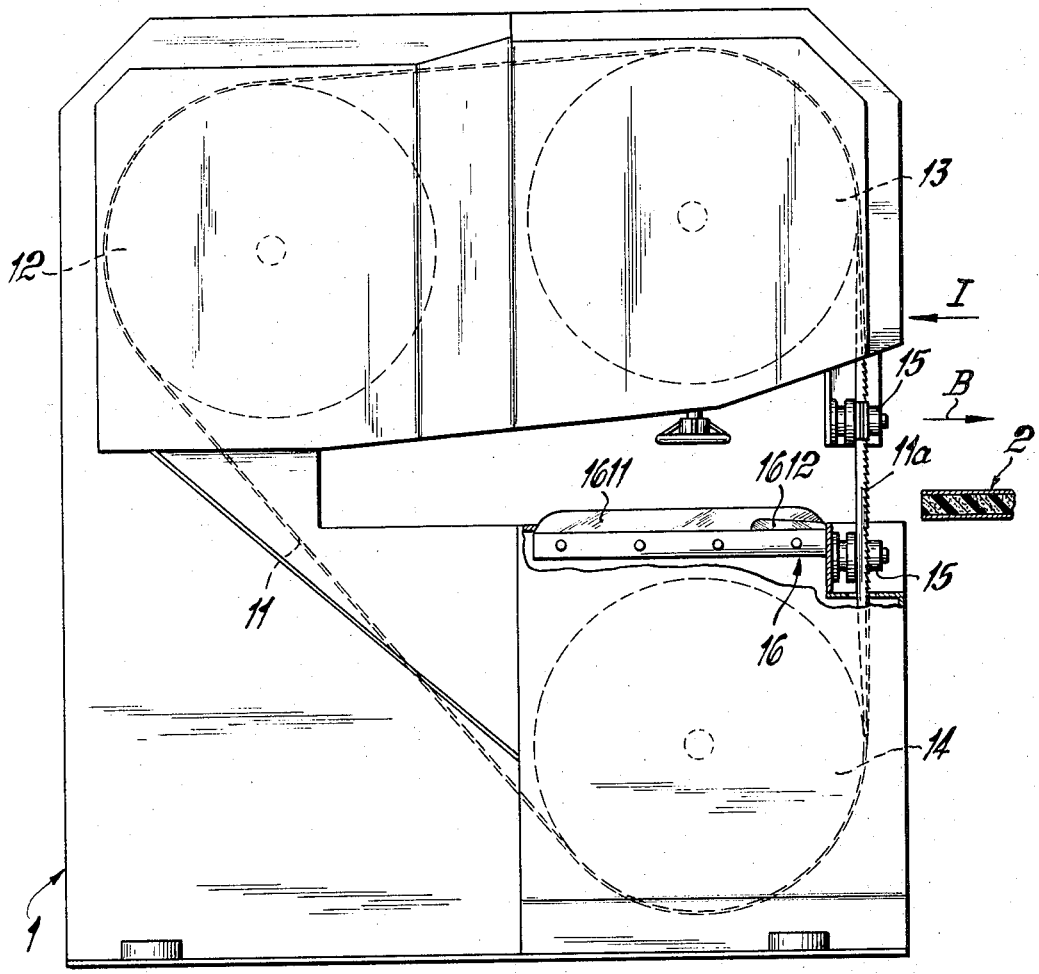
FIG. 1 is a diagrammatic side elevational view of a bandsawing machine which embodies the invention.
Figure 2:
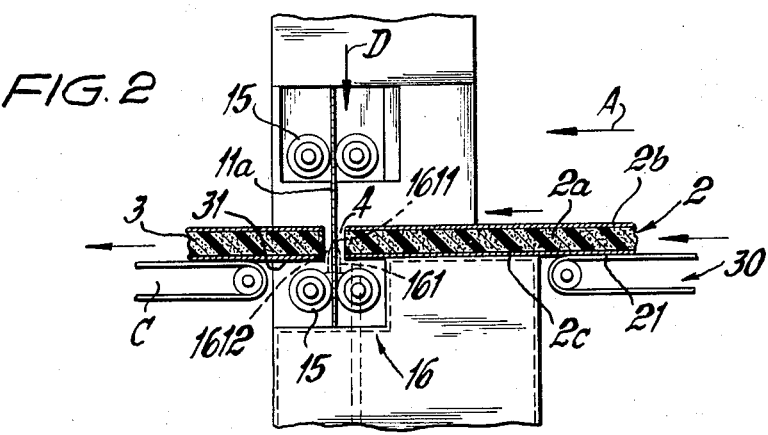
FIG. 2 is a fragmentary front elevational view of the machine as seen in the direction of arrow I.

The drawing illustrates a bandsawing machine which comprises a frame 1 movable in and counter to the directions indicated by the arrows A and B. The arrow A indicates the direction of lengthwise feed of an elongated compound plate 2 which is transported by a suitable conveyor 30 so as to advance at a predetermined speed. The arrow B indicates the direction of movement of the frame 1 from one to the other side of the moving plate 2 whereby a vertically extending portion 11a of an endless saw band 11 forms in the moving plate 2 a transversely extending kerf 4 shown in FIG. 2. The frame 1 is movable from and back to a starting position by first moving in the directions indicated by arrows A and B, by thereupon moving in the direction of arrow A but counter to the direction of arrow B, and by finally moving counter to the direction of arrow A. The plate 2 continues to move in the direction indicated by the arrow A.

The saw band 11 is trained over wheels, rollers or pulleys 12, 13, 14 which are mounted in the frame 1 and at least one of which (e.g., the member 14) is driven to move the band 11 lengthwise (arrow D). The pairs of rollers 15 serve to twist the band portion 11a through 90°.

The frame 1 further supports an accelerating device 16 which extends in the direction of the arrow B and is located behind the band portion 11a so that it enters the freshly formed kerf 4 while the band portion 11a moves in directions indicated by the arrows A and B. The accelerating device 16 defines a dovetailed groove for a removable accelerating tool 161 which includes a guide 1611 for the band portion 11a and two deburring or burr removing surfaces 1612. The reference character C denotes a discrete second conveyor which serves to move freshly separated portions 3 of the plate 2 in the direction indicated by the arrow A but at a speed (about 10 yd/min) exceeding the speed of the upper stretch of the conveyor 30 (about 5 yd/min) so that the portion 3 is moved forwardly and away from the next-following portion of the moving plate 2 with attendant increase in the width of the kerf 4. During movement of the band portion 11a with a speed about 10 in./sec. across the forwardly advancing plate 2, the surfaces 1612 remove burrs from the lower edges of surfaces 21, 31 flanking the kerf 4. The plate 2 comprises a central or core layer 2a of foam synthetic plastic material and two outer layers 2b, 2c of steel or the like.

The conveyor C can be omitted altogether if the drive means for the frame 1 is designed to accelerate the frame in the direction A immediately upon completion of a kerf 4 and while the accelerating device 16 still extends into the freshly formed kerf. This causes the device 16 to perform the function of the conveyor C by increasing the width of the kerf 4 to an extent which is necessary to allow for unimpeded return movement of the band portion 11a counter to the direction indicated by the arrow B. Once the band portion 11a is retracted from the freshly formed and temporarily expanded kerf 4, the separated portion 3 is decelerated due to frictional engagement with its support so that the next-following portion of the plate 2 catches up with and pushes the portion 3 in front of it toward a collecting station or onto a conveyor, not shown. The acceleration of the portion 3 in direction indicated by the arrow A is effected by the band guide 1611.

When the band portion 11a is retracted to the one side of the continuously moving plate 2, the frame 1 is caused to move counter to the direction indicated by the arrow A so that it returns to the starting position. The making of the next kerf 4 is started as soon as the frame 1 begins to move simultaneously in directions indicated by the arrows A and B. The next-following portion of the plate 2 can catch up with and pushes the freshly separated portion 3 as soon as the band portion 11a is retracted to the one side of the plate 2. The width of the kerf 4 may decrease gradually during movement of the band portion 11a counter to the direction indicated by the arrow B but the maximum width of the kerf is preferably calculated in such a way that the band portion 11a can be retracted without any pinching between the freshly severed portion 3 and the next-following portion of the plate 2.

The conveyor C will be utilized when the material of the outer layers 2b, 2c is less prone to scoring, scratching or the like in response to engagement with the rapidly advancing upper stretch of this conveyor. The conveyor C can be set in motion to advance its upper stretch at a speed exceeding the speed of the upper stretch of the conveyor 30 in response to completed movement of the band portion 11a or frame 1 in the direction indicated by the arrow B. The surfaces 1612 are sufficiently rough and wear-resistant to bring about a satisfactory removal of burrs, at least along the adjacent ends of the surfaces 21, 31 at the undersides of the plate 2 and portion 3.

It was found that the improved bandsawing machine is capable of severing the plates 2 at a desired frequency, with minimal generation of sawdust and with generation of burrs which can be completely or nearly completely removed while the plate 2 is in motion so that the portions 3 need not be subjected to a separate deburring treatment. The cuts across the continuously moving plate are at least as clean but normally much more satisfactory than those made in conventional machines even though the plate 2 is caused to advance at a relatively high speed.

The details of construction of the drive means for the conveyors 30 and C, the frame 1 and the band 11 form no part of the invention. The member 14 can be driven by an electric motor. The conveyors 30 and C can be driven by a second motor. The frame 1 can be moved by a rack and pinion drive F to advance in and counter to the direction indicated by the arrow A and by a fluid-operated motor 8 to move in and counter to the direction indicated by the arrow B. Suitable limit switches and/or photoelectric detectors may be used to automatically start successive movements of the frame 1 and conveyor C in a predetermined sequence and for predetermined intervals of time so that the frame 1 moves from and back to the starting position and the conveyor C (if used) is accelerated in response to separation of successive portions 3 from the moving plate 2.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended:

1. A method of severing elongated plates by means of a saw band in a bandsawing machine, particularly of severing compound plates of the type having a central layer of foamed synthetic plastic material sandwiched between outer layers of relatively hard material, comprising the steps of moving an elongated plate at a predetermined speed in a first direction; moving the saw band sideways from a starting position at one side of the moving plate in said first direction at said predetermined speed and simultaneously moving the band in a second direction from said one side toward the other side of the moving plate whereby the band forms a kerf across and separates a portion from the leading end of the moving plate; abruptly accelerating the thus separated portion in said first direction to thus only temporarily increase the width of said kerf; moving the band in the thus enlarged kerf counter to said second direction and simultaneously moving the band in said first direction so as to return the band to said one side of the moving plate before the width of said kerf decreases again; moving the band counter to said first direction back to said starting position; and again moving the band in said first and second directions to thus separate a second portion from the moving plate.

2. A method as defined in claim 1, further comprising the step of decelerating successively severed portions so that the next-following portions of the moving plate catch up with and push the thus decelerated portions in said first direction.

3. A method as defined in claim 1, wherein said accelerating step comprises increasing the speed of the band in said first direction beyond said predetermined speed while the band or a member sharing its movement in said first direction is still located in the respective kerf so that the freshly separated portions are propelled in said first direction away from the next-following portions of the moving plate.

4. A method as defined in claim 1, wherein said accelerating step comprises positively entraining successively severed portions in said first direction at a speed exceeding said predetermined speed.

5. In a bandsawing machine for severing of elongated plates, particularly for severing of plates wherein a central layer of foamed synthetic plastic material is sandwiched between relatively hard outer layers, a combination comprising means for moving an elongated plate lengthwise in a first direction and at a predetermined speed; a frame movable in and counter to said first direction from and back to a starting position and in and counter to a second direction transversely of the moving plate; a travelling endless saw band mounted on said frame for movement therewith so as to form in the moving plate a kerf during simultaneous movement with said frame in said first and second directions; and accelerating means mounted in said frame for movement with said band to enter the kerf behind said band, said accelerating means including a narrow guide for that portion of the saw band which penetrates the material of the moving plate, said frame with said saw band and guide being movable in said first direction at a speed exceeding said predetermined speed while said accelerating means is located in a freshly completed kerf to thus abruptly propel the freshly severed portion of the plate in said first direction away from the next-following portion of the plate with attendant temporary widening of the kerf to provide room for movement of the band counter to said second direction before said kerf narrows again.

6. A combination as defined in claim 5, wherein said second direction is normal to said first direction.

7. A combination as defined in claim 5, further comprising means provided on said frame for twisting successive increments of the travelling band prior to their penetration into the plate.

* * * * *